United States Patent [19]
Nobile

[11] Patent Number: 6,016,627
[45] Date of Patent: Jan. 25, 2000

[54] COMPOSITE MUSHROOM GROWING TRAY

[76] Inventor: John R. Nobile, 65 Forest Ave., Fairfield, Conn. 06430

[21] Appl. No.: 09/111,067

[22] Filed: Jul. 7, 1998

Related U.S. Application Data

[60] Provisional application No. 60/080,600, Apr. 3, 1998.

[51] Int. Cl.⁷ ...................................................... B65D 1/00
[52] U.S. Cl. .............................................. 47/1.1; 206/912
[58] Field of Search ............................... 77/1.1; 206/509, 206/512; 220/608; D11/156

[56]  References Cited

U.S. PATENT DOCUMENTS

| | | | |
|---|---|---|---|
| 3,341,064 | 9/1967 | Ricci | 206/512 |
| 3,485,434 | 12/1969 | Donovan et al. | 220/608 X |
| 3,583,623 | 6/1971 | Golner | 220/608 X |
| 3,842,534 | 10/1974 | Walters et al. | 47/1.1 |
| 3,992,808 | 11/1976 | Stengel | 47/1.1 |
| 4,001,966 | 1/1977 | Metzner | 47/1.1 |
| 4,349,124 | 9/1982 | Faller | 220/608 X |
| 4,442,969 | 4/1984 | Holden | 220/608 X |
| 5,040,328 | 8/1991 | Coon | 47/1.1 |
| 5,415,293 | 5/1995 | Ackermann et al. | 206/509 X |

*Primary Examiner*—Michael J. Carone
*Assistant Examiner*—Jeffrey L. Gellner
*Attorney, Agent, or Firm*—Fattibene & Fattibene; Paul A. Fattibene; Arthur T. Fattibene

[57]  ABSTRACT

A stackable mushroom tray having a plurality of curved ribs that extend near but do not contact sidewalls of the tray. Open corner receptacles are formed at each corner of the tray to receive a spacer. Support feet are formed within each corner of the tray to receive a top surface of the spacer. Raised corrugations are placed between the curved ribs with a plurality of holes between the raised corrugations. A lip is formed around the perimeter of the sidewalls. The tray is preferably made of a composite material such as a plastic and fibrous material that can be easily molded. The structure and configuration of the tray permits a relatively thin walled tray to be used, yet is extremely rigid and can be stacked easily while maintaining lateral stability. The tray can be easily manufactured, relatively inexpensively, provides additional growing space, and requires virtually no assembly, greatly simplifying mushroom growing.

16 Claims, 7 Drawing Sheets

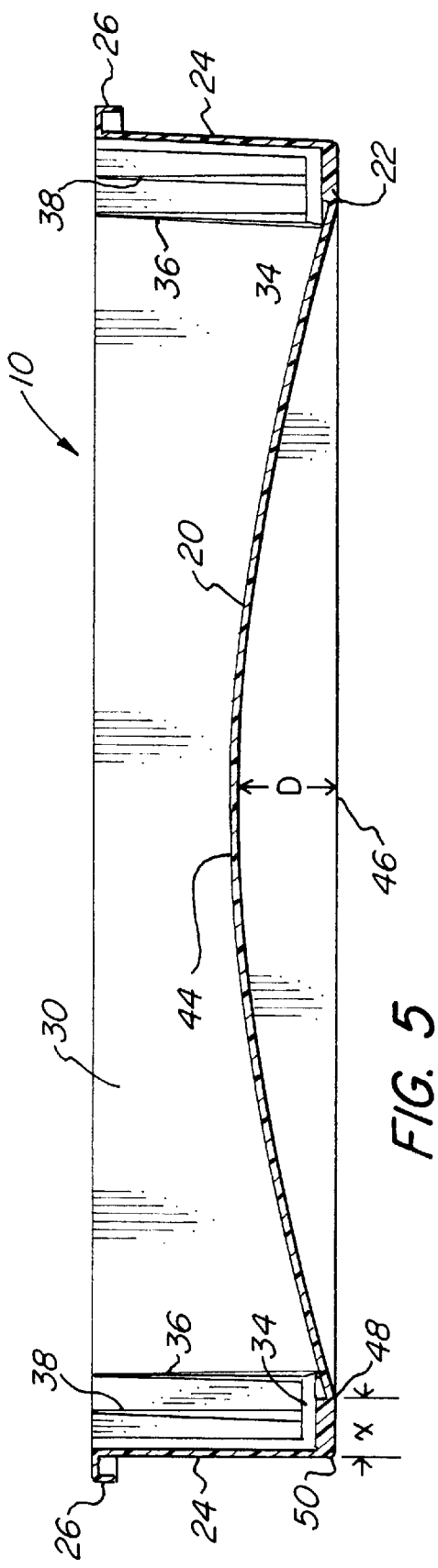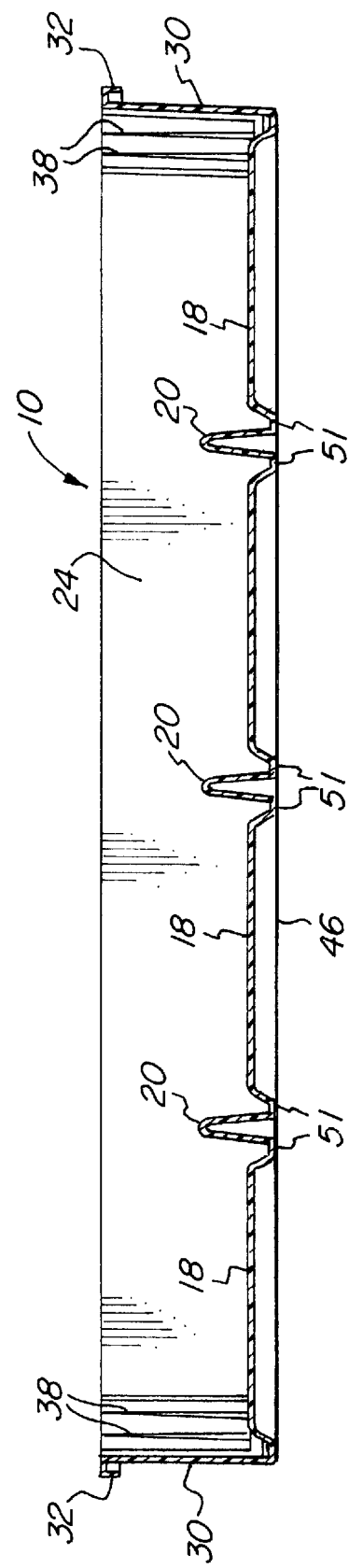

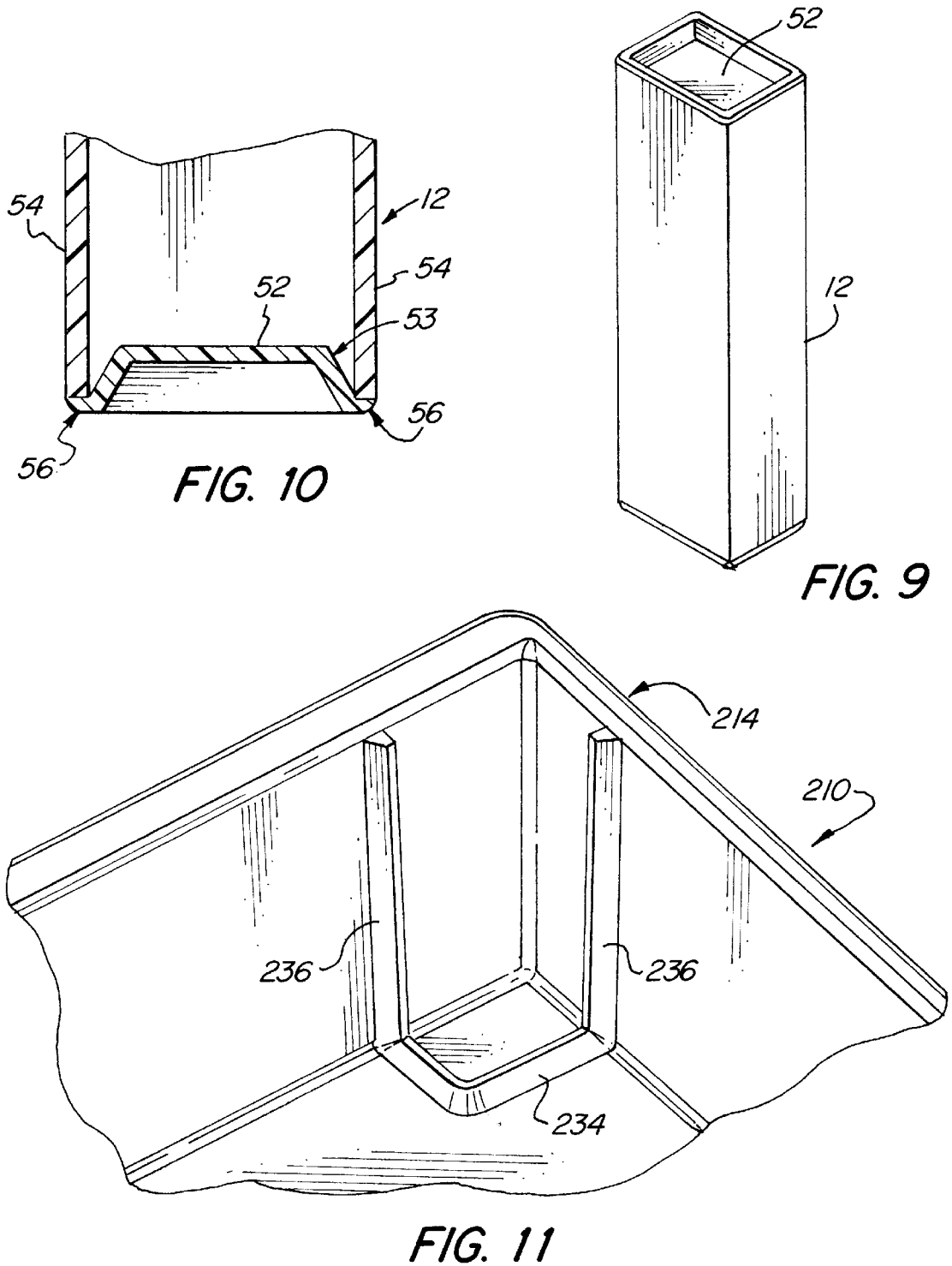

COMPOSITE MUSHROOM GROWING TRAY

RELATED APPLICATION

This application claims the benefit of U.S. provisional application No. 60/080,600, filed Apr. 3, 1998.

FIELD OF THE INVENTION

The present invention relates generally to stackable composite mushroom trays used for growing mushrooms, and particularly to a mushroom tray having relatively thin walls and rigid construction.

BACKGROUND OF THE INVENTION

Stackable trays have been used for growing mushrooms for many years. Many of these trays are made of wood, are relatively heavy and difficult to move. Additionally, some mushroom trays have a relatively complex structure that are costly to manufacture and maintain. One such tray is disclosed in U.S. Pat. No. 3,992,808 entitled "Mushroom Tray" and issuing to Stengel on Nov. 23, 1996, which is herein incorporated by reference. Therein disclosed is a rectangular wooden tray with four wooden legs tied together by a system of cross bracing. Another container for growing mushrooms is disclosed in U.S. Pat. No. 4,001,966 entitled "Growing Tray Structure, As For Mushrooms" issuing to Metzner on Jan. 11, 1977, which is herein incorporated by reference. Therein disclosed is a structure fabricated of steel-wire mesh affixed to a frame of beam and column supports, and lined with plastic. A plurality of bed structures are stacked. Another mushroom tray is disclosed in U.S. Pat. No. 3,842,534 entitled "Mushroom Tray" and issuing to Walters et al on Oct. 22, 1974, which is herein incorporated by reference. Therein disclosed is a corrosion-resistant extruded aluminum tray with improved air circulation with bottom cross members extending to the side panels. Yet another mushroom tray is disclosed in U.S. Pat. No. 5,040,328 entitled "Mushroom Tray" and issuing to Coon on Aug. 20, 1991, which is herein incorporated by reference. Therein disclosed is a rectangular mushroom tray having corrosion-resistant eye beams positioned to strengthen and stiffen the bottom sheet, and a plurality of clips for securing the eye beams to the underside of the bottom sheet. The trays are made of a polyolefin and the eye beams are made of aluminum. While many of these trays are adequate, they are not suitable for all conditions. For example, while many wooden trays are inexpensive to manufacture, they have a relatively short life and often decompose in the relatively harsh mushroom growing environment, and therefore, generally do not last long. Other tray constructions are relatively complex involving multiple different materials and assemblies, with a considerable amount of structure directed to improving rigidity so that the trays can be stacked and moved with a forklift. The lack of rigidity and complexity of the various structures of the different mushroom trays is a considerable disadvantage, resulting in increasing costs and complexity in the growing and harvesting of mushrooms. These problems are increased, considering the desire to produce larger trays for improved economies of handling. Many of these trays have resulted in failure due to repeated handling and fatigue. Additionally, some of these trays have an undesirable amount of flex resulting in difficult handling and breakage. Therefore, there is a need for an improved, easily manufactured mushroom tray having increased rigidity and longevity.

SUMMARY OF THE INVENTION

The present invention comprises a rectangular mushroom tray made of a composite plastic material with fibrous reinforcement that may be easily molded. The bottom surface of the tray has a plurality of graduated height ribs that extend laterally and end near the opposing sidewalls, leaving a gap between the oposing sidewalls and the end of the graduated height ribs. A plurality of corrugations extend perpendicular to and are placed between the graduated height ribs, improving rigidity. Between each corrugation is a plurality of holes, reducing weight and improving air circulation and heat transfer. The inside corners of the tray have receptacles for receiving a spacer used in stacking the trays. The outside corners of the tray have a recessed and raised guiding portion which helps to center the tray upon stacking and reduce lateral movement. In one embodiment, the corner receptacles are open to the interior of the tray, permitting easy cleaning.

Accordingly, it is an object of the present invention to provide a simple, cost effective, mushroom growing tray.

It is another object of the present invention to provide a rigid tray with less bulk and weight.

It is yet another object of the present invention to provide a tray that has additional growing area and soil capacity by having relatively thin rigid walls.

It is an advantage of the present invention that a graduated height beam configuration is used, having improved rigidity with reduced failure due to fatigue.

It is another advantage of the present invention that it is easily manufactured with conventional molding techniques.

It is a feature of the present invention that the graduated height ribs do not extend completely to the sidewalls.

It is another feature of the present invention that in one embodiment the corner receptacles are open to the interior of the tray.

These and other objects, advantages, and features will become readily apparent in view of the following description.

BRIEF DESCRIPTION OF THE DRAWINGS

FIG. 5 is a cross section of the tray taken along line 5—5 in FIG. 2.

FIG. 6 is a cross section of the tray taken along line 6—6 in FIG. 2.

FIG. 9 is a perspective view of a spacer.

FIG. 10 is a cross section of a portion of the spacer illustrated in FIG. 9.

FIG. 11 is a perspective view of another embodiment of the present invention with a corner receptacle for the spacer illustrated in FIG. 9.

DETAILED DESCRIPTION OF THE PREFERRED EMBODIMENTS

Figure 1:
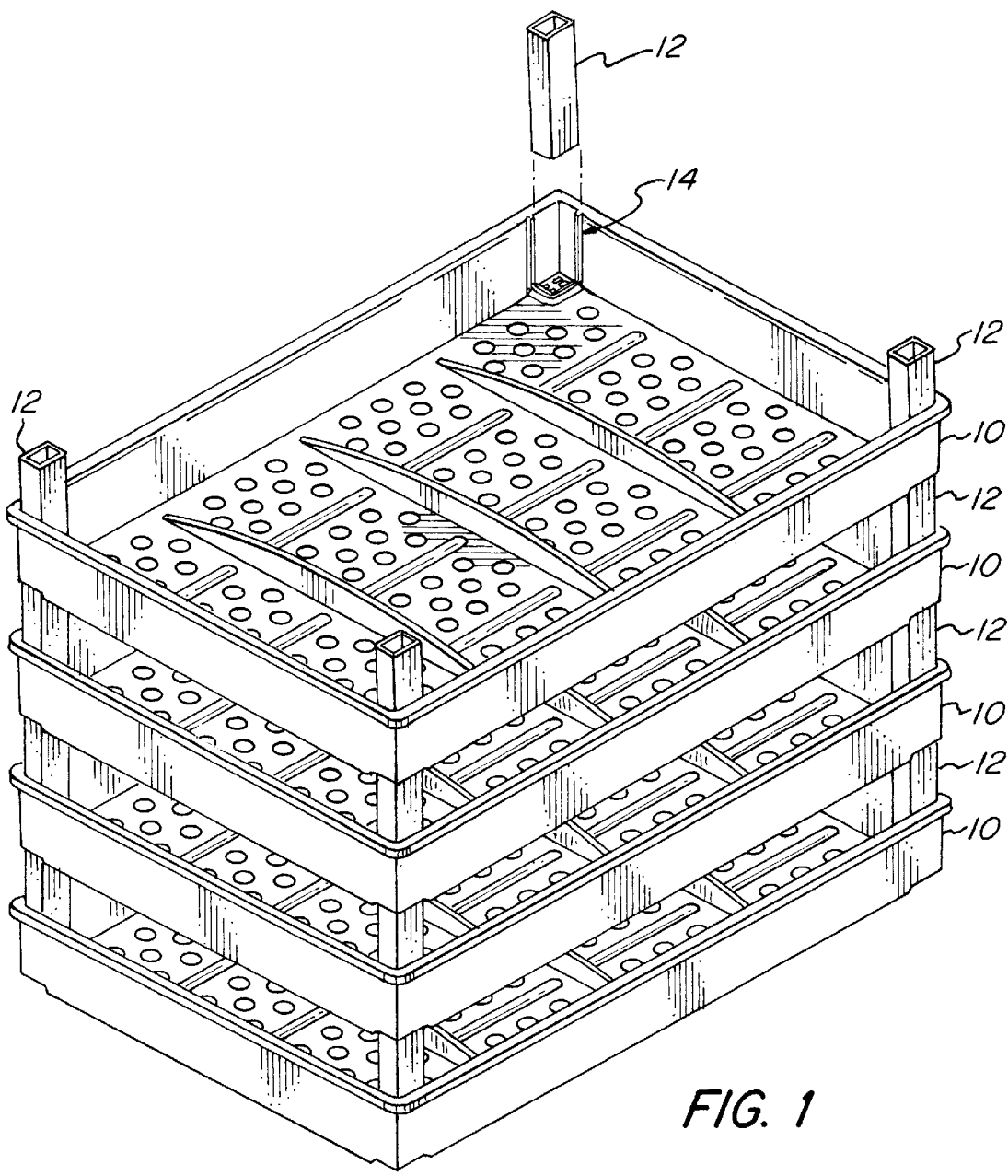
FIG. 1 is a perspective view illustrating a plurality of stacked mushroom trays.

FIG. 1 is a perspective view illustrating a plurality of mushroom growing trays 10 stacked one on top of the other and separated by spacers 12. The spacers 12 are inserted into an open corner receptacle 14. The trays 10 are preferably made from a composite material, including a plastic material with a fibrous reinforcement, such as fiberglass, imbedded therein. Accordingly, the tray can easily be formed by a conventional molding or forming process. For example, a closed molding process using fiberglass reinforced plastic resin. This, in combination with the structure of the tray, makes possible the use of a thin wall, about 0.12 to 0.25 inches or about 0.31 to 0.64 cm thick.

Figure 2:
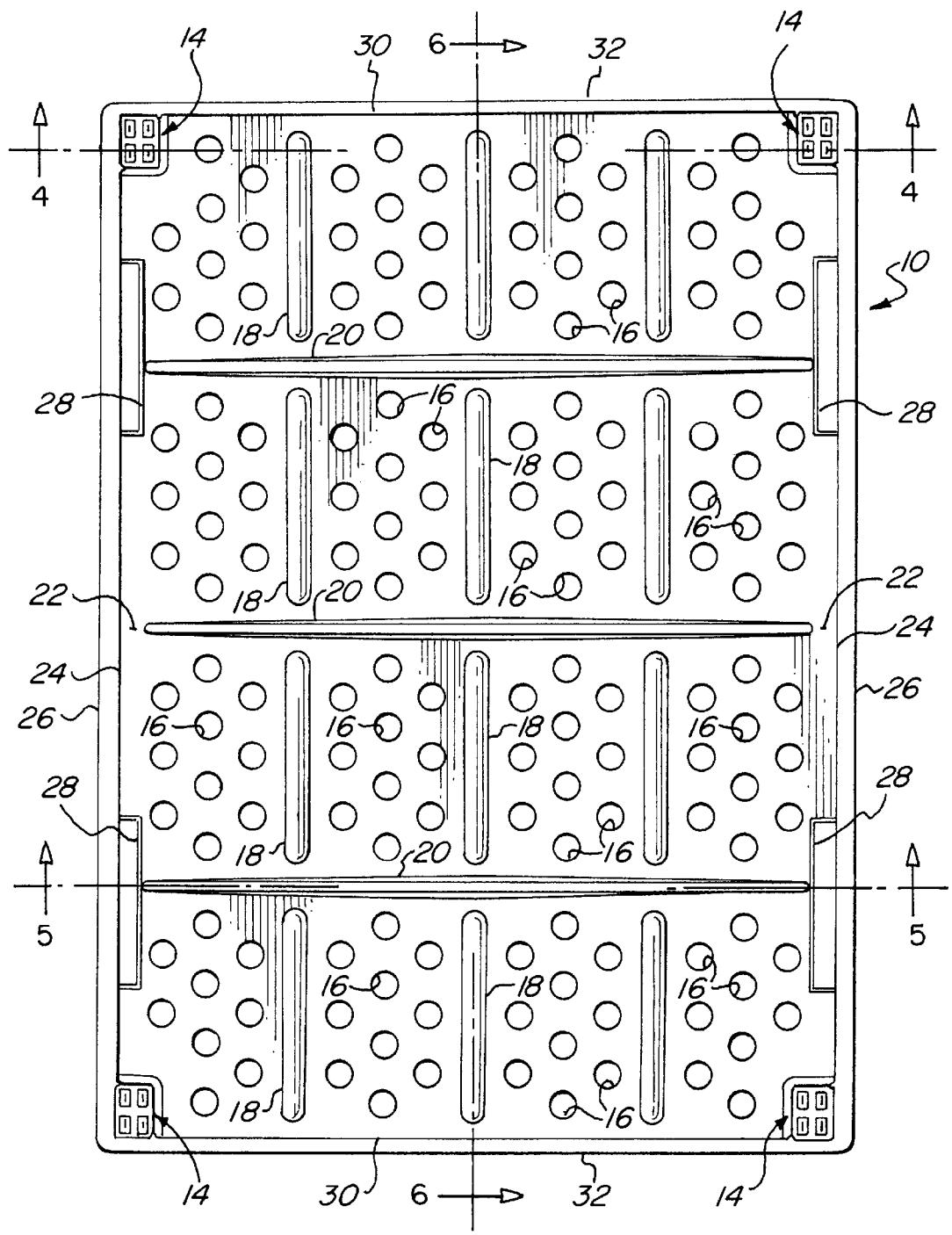
FIG. 2 is a plan view of one tray.

FIG. 2 is a plan view, more clearly illustrating many of the features and details of construction of the present invention. A plurality of holes 16 is formed on the bottom surface of the tray 10. The tray 10 is indicated to be rectangular, but may be any shape, such as a square. The holes 16 aid in ventilation, heat transfer, and reduce the weight of the tray 10. The holes 16 are bounded on one side by a plurality of raised corrugations 18. Separating the plurality of raised corrugations 18 are a plurality of curved ribs 20. The curved ribs 20 extend laterally, nearly contacting opposing longitudinal sidewalls 24. However, there is a gap 22 between the end of the curved ribs 20 and the longitudinal sidewalls 24. This gap 22 greatly improves the performance of the mushroom growing tray 10 in that stress or fatigue points are greatly reduced at the junction or intersection of the sidewalls 24 and the bottom surface of the tray 10. Accordingly, the curved ribs 20 transfer a substantial portion of the load from the bottom surface of the tray 10 to the longitudinal sidewalls 24. The longitudinal sidewalls 24 function as a structural beam member and have an inturned flange or lip 26 thereon. The lip 26 adds to the rigidity of the tray 10. Accordingly, the loads on the bottom surface of the tray 10 are transferred substantially by the corrugations 18 to the curved ribs 20, which further transfers loading to the longitudinal sidewalls 24. The relatively simple, efficient configuration of the tray 10 makes possible the use of the relatively thin walled tray while maintaining high rigidity. This is important because the tray bottom must not sag under loaded conditions, which would reduce the crop in the tray below it and reduce airflow between trays. Reinforcing portions 28 are utilized at a predetermined distance apart, providing additional support when a stack of trays 10 are picked up by a forklift. The lateral sidewalls 30, joining the longitudinal sidewalls 24, also have a lip or inturned flange 32 thereon. At the corners formed by the longitudinal sidewalls 24 and the lateral sidewalls 32 are positioned corner receptacles 14. It should be appreciated that the structure of the mushroom tray 10 provides substantial support even when the tray 10 is filled with relatively heavy organic growing material in which the mushrooms are grown.

Figure 3:
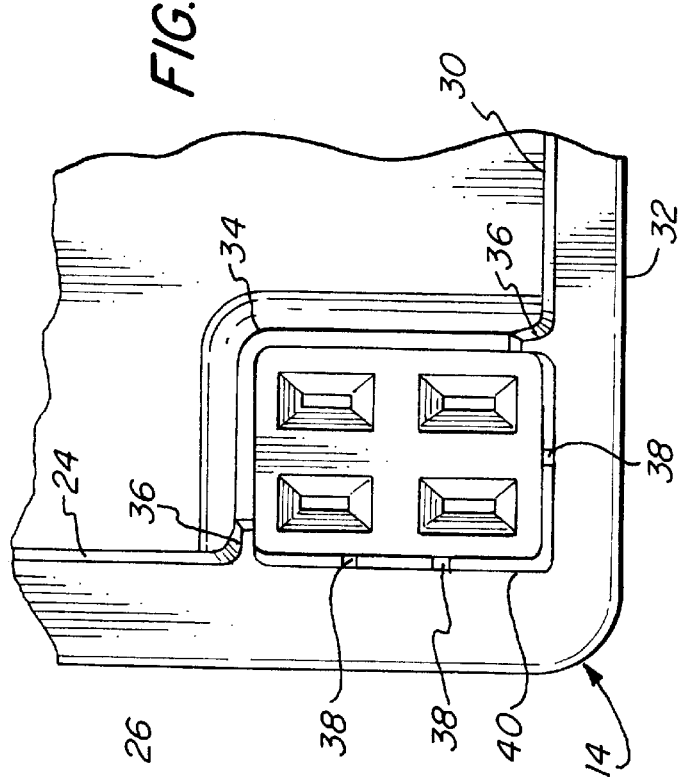
FIG. 3 is an enlarged view of one corner of the tray illustrated in FIG. 2.

FIG. 3 is an enlarged view, more clearly illustrating a corner receptacle 14. At the bottom of the corner receptacle 14 is a placement ridge 34. The placement ridge 34 functions to retain the bottom portion of a spacer placed within the corner receptacle 14. Attached to and extending vertically along the sidewalls 24 and 30 are placement edges 36. The placement edges 36 act to retain a spacer 12, illustrated in FIG. 1, in position, yet permit the corner receptacle 14 to be open to the interior of the tray permitting easy cleaning. Additionally, along the sidewalls 24 and 30 within the corner receptacle 14 area are spacer guides 38. The spacer guides 38 help to frictionally retain a spacer within the corner receptacle 14. The spacer guides 38 are particularly advantageous when a draft angle is used in the corner receptacle 14 such that the inner surface of the sidewalls 24 and 30 are angled slightly. Accordingly, at the bottom of the corner receptacle 14, a very small or no gap would exist between the sidewalls 24 and 30, and a small but larger gap would exist at the top surface between the sidewalls 24 and 30 and the spacer, when a spacer having a uniform cross section is inserted. Location 40 at the top surface illustrates the gap location. At the bottom of the corner receptacle 14 are bottom support feet 42.

Figure 4:
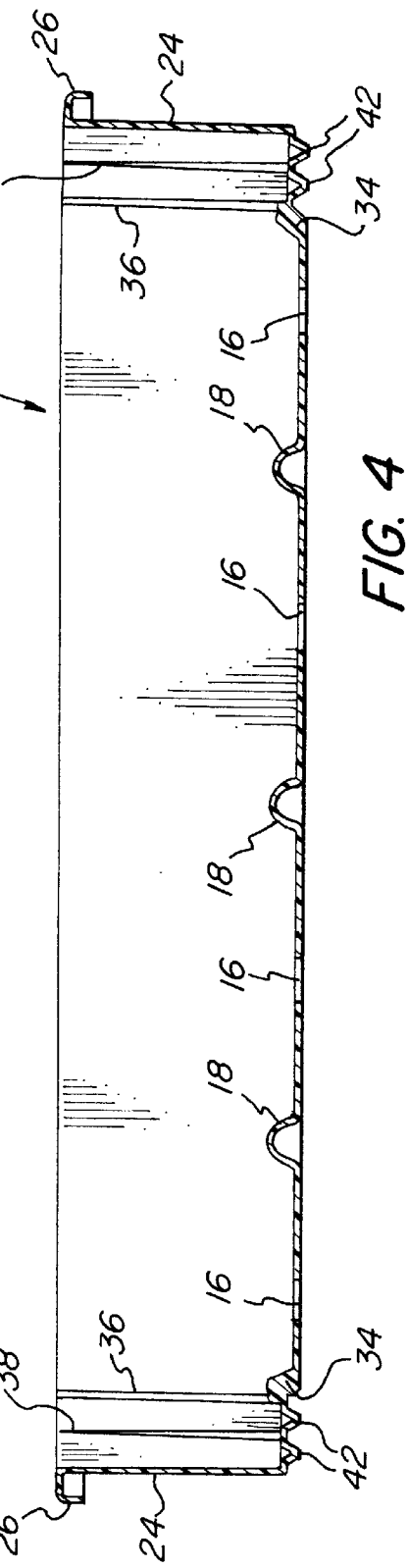
FIG. 4 is a cross section of the tray taken along line 4—4 in FIG. 2.

FIG. 4 is a cross section taken along line 4—4 in FIG. 2. FIG. 4 more clearly illustrates the raised corrugations 18. Additionally, the lips or inturned flanges 26 can more clearly be seen. The bottom support feet 42 have angled surfaces and are recessed such that the bottom portion of the support feet 42 is in the same plane as the bottom of the tray 10. Accordingly, when a plurality of trays are stacked with spacers, the support feet 42 nest within a top surface of the spacer, helping the tray to self-center and preventing lateral movement, as well as transferring load from a lower tray to the floor.

FIG. 5 is a cross section taken along line 5—5 in FIG. 2. FIG. 5 more clearly illustrates the graduated height or curved ribs 20. The ribs 20 have a maximum height D between a central maximum height point 44 and the bottom plane 46 of the tray 10. The height D may be between approximately three and four inches, or approximately seven and ten centimeters. The curved rib 20 ends or coincides with the bottom plane 46 at point 48. Accordingly, a distance X is formed between point 48 identifying the end of the rib 20 and point 50 at the end of the sidewall 24 were the bottom of the tray 10 and the sidewall 24 meet or intersect. Accordingly, a space or gap 22 having a distance X is formed between each end at location 48 of the rib 20 and the sidewalls 24. This space or gap 22 greatly reduces any stress points formed at the junction of the bottom surface and the sidewall 24 of the tray 10. The linear distance X of gap 22 need not be very great, and may be relatively small. The gap 22 in combination with the sidewalls 24 and lip or inturned flanges 26 function as an I type beam improving rigidity.

FIG. 6 is a cross section taken along line 6—6 in FIG. 2, and more clearly illustrates a longitudinal cross section of the tray 10. The shape of the curved ribs 20 and the raised corrugations 18 along a different axes can more clearly be seen. FIG. 6 also illustrates a land 51 formed between the raised corrugations 18 and the curved ribs 20. The lands 51 are formed in the same plane as the bottom plane 46 of the tray 10. Additionally, the inturned flange or lip 32 can more clearly be seen.

Figure 7:
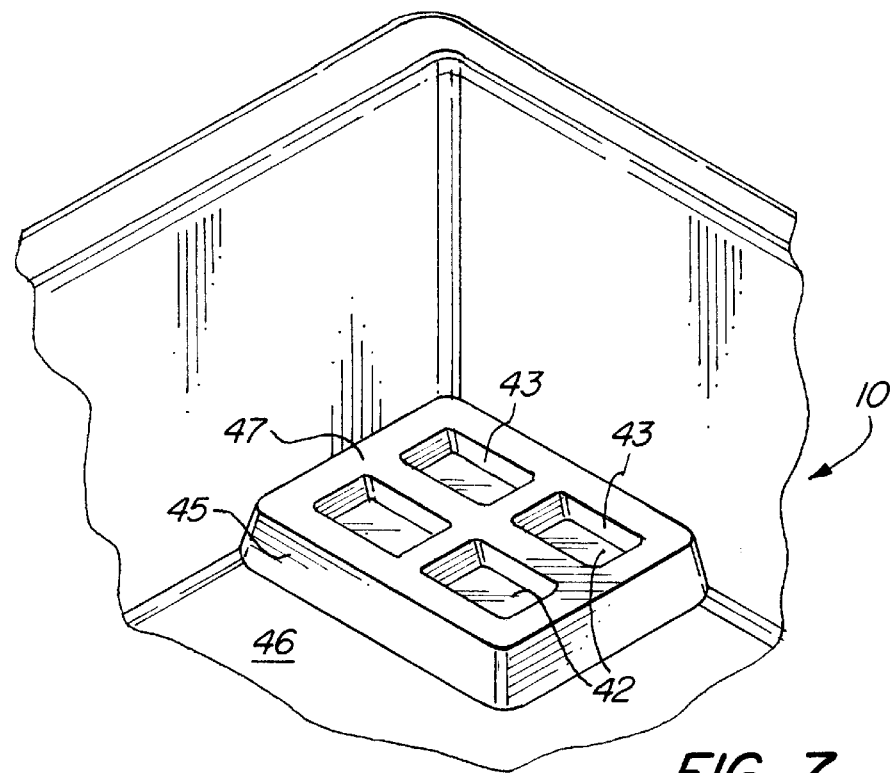
FIG. 7 is a perspective view of the outside corner of one embodiment of the tray.

FIG. 7 is a perspective view of a portion of the tray 10, more clearly illustrating the outside surface of a corner receptacle 14 with the bottom support feet 42. A portion of the support feet 42 are recessed from the bottom plane 46 of tray 10. A recessed corner plane 47 is formed by angled tray surface 45 on each corner recessed up from the bottom 46 of the tray 10. However, the bottom surface of the support feet 42 are on the same plane as bottom plane 46. Therefore, when bottom plane 46 is resting on the ground, a load on the corner receptacle is transferred to the ground or floor by support feet 42. Additionally, the support feet 42 have an angled surface 43 so as to nest or be self-aligning on the top surface of a spacer. Additionally, four separate support feet 42 are illustrated and the top surface of a spacer may have a cross member that fits between the support feet 42 for additional support.

Figure 8:
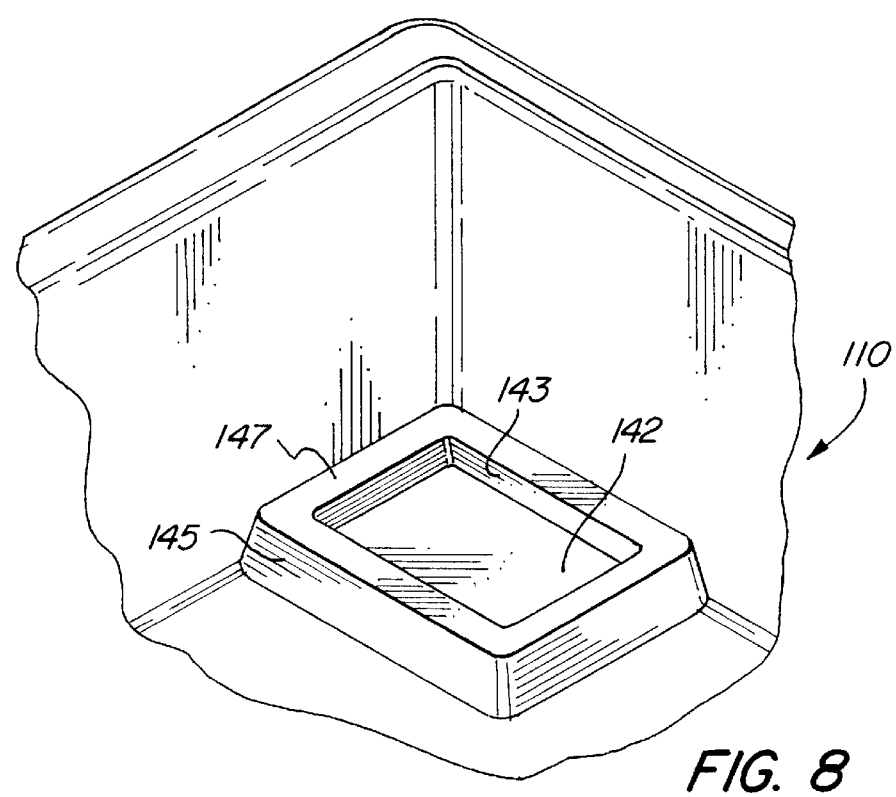
FIG. 8 is a perspective view of the outside corner of another embodiment of the tray.

FIG. 8 illustrates another embodiment wherein a unitary support foot 142 is used. A recessed corner plane 147 is formed by angled tray surface 145 on each corner recessed up from the bottom of the tray 110. The unitary support foot 142 has sloping sides 143 that help self-center support foot 142 within a spacer used for stacking the trays 110.

FIG. 9 is a perspective view more clearly illustrating a spacer 12. This spacer 12 is illustrated as being rectangular with a rectangular cross section, but may be any shape, such as a shape having a triangular cross section. The spacer 10 has a recessed cap 52. The recessed cap 52 is sized to receive the support feet 42 and 142, illustrated in FIGS. 7 and 8.

FIG. 10 is a cross section showing a portion of the spacer 12. The cap 52 may have angled walls 53 for receiving the support feet 42 and 142, illustrated in FIGS. 7 and 8. This helps to self-align the trays upon stacking and prevent lateral movement, making the trays much more stable when stacked. The cap 52 has cap feet 56 that press against spacer walls 54 when stacked.

FIG. 11 is a perspective view illustrating more clearly a corner receptacle 214. The corner receptacle 214 is very similar to the corner receptacle of the embodiment illustrated in FIGS. 1 and 2. However, the corner receptacle 214 illustrated in FIG. 11 does not have support feet formed at the bottom thereof. The placement edges 236 in combination with the placement ridges 234 help to securely hold the spacer within the corner receptacle 214, yet permit the corner receptacle 214 to be open to the interior of the tray 210. This greatly facilitates cleaning and permits debris to be easily removed prior to placing a spacer 12, illustrated in FIG. 9, within the corner receptacle 214.

Figure 12:
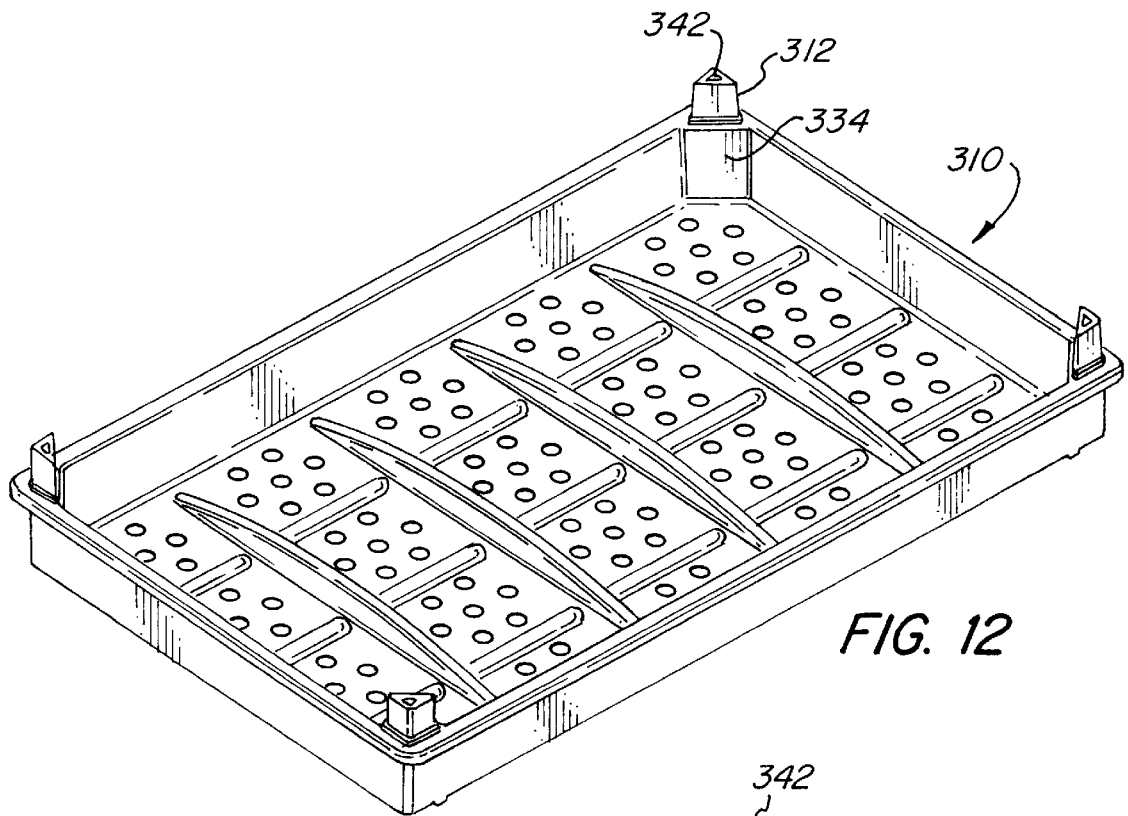
FIG. 12 is a perspective view of another embodiment of the present invention with different corner receptacles.

FIG. 12 is a perspective view illustrating another embodiment of a tray 310, according to the present invention. In this embodiment, a triangle shaped corner receptacle having a placement web 334 forming a triangular shaped receptacle is illustrated. Into this triangular shaped receptacle is placed a spacer 312 having a triangular shaped cross section. The triangular shaped spacer 312 has an aligning support 342 having angled surfaces which may be used to mate with the bottom of a tray to be stacked on top thereof.

Figure 13:
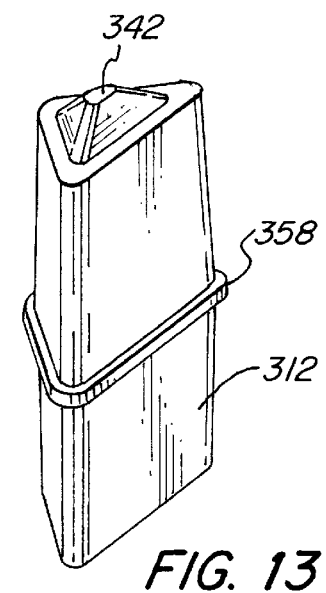
FIG. 13 is a perspective view of another embodiment of a spacer used with the tray illustrated in FIG. 12.

FIG. 13 is a perspective view more clearly illustrating the spacer 312. The spacer 312 may have an intermediate lip 358 thereon to create an additional bearing surface and to indicate that the spacer 312 is fully seated in the tray 310, illustrated in FIG. 12.

Accordingly, the present invention provides for a stackable tray used for growing mushrooms that has a relatively thin wall that can be made by conventional molding processes rapidly and at low cost, yet that is very rigid. A lip is provided around the outer edge to give the sidewalls a high bending strength and also lateral stability. A high traction surface geometry may be molded onto the top of the lip so that it can safely support workers standing on the edges without danger of slipping. Additionally, the four corner receptacles molded into the tray may receive spacers so that the trays can be stacked one on top of the other with a predetermined space between the trays. These spacers or legs will self align with the bottom of the tray stacked above so that the stack will be safely aligned and will be less likely to misalign, which could result in a dangerous condition. Additionally, extensions may be used which also may self align that fit over the legs to increase the distance between the trays in order to allow for harvesting the mushrooms. The legs or spacers may be of a triangular cross section in order to take up a minimum of growing space in the tray, as well as to give them a high buckling strength with a minimum of material. The equally spaced ribs on the horizontal bottom surface of the tray may be of any number and may be of a height of approximately three to four inches, or seven to ten centimeters, and run laterally across the tray. Accordingly, loads are transferred to the vertical sidewall areas and then to the corners. Corrugations between the lateral ribs, which may number about three equally spaced, impart stiffness to the bottom surface of the tray and transfer load to the lateral ribs. This combination of surface features allows the tray bottom to have a relatively thin wall section and still be able to withstand high loading without deflecting significantly or sagging over time. Between the corrugations, the tray bottom is flat and has holes to provide ventilation and to aid in heat transfer. The legs may be molded as part of the tray or made a separate part. Additionally, a section of the vertical wall along the longitudinal axis of the tray is designed so that it is strong enough to safely withstand the load of lifting a stack of eight fully loaded trays, supported with legs or spacers in the corners, from the bottom one with a forklift truck. The material used for the construction of the tray is preferably a smooth, non-porous material that does not absorb water or micro organisms so that it can be easily and quickly cleaned between uses, if required. The thin wall desing also provides greater growing area and higher soil capacity, which increases the value of the crop over previously designed trays.

Accordingly, the present invention provides a structure that is very rigid and economical and that greatly facilitates the growing and harvesting of mushrooms. Although the preferred embodiment has been illustrated and described, it will be obvious to those skilled in the art that various modifications may be made without departing from the spirit and scope of this invention.

What is claimed is:

1. A rectangular mushroom growing tray made of a composite material comprising:

a plurality of sides, including two longitudinal sides and two lateral sides;

a lip formed on at least the two longitudinal sides of said plurality of sides;

a bottom connected to said plurality of sides, said bottom having a plurality of holes therein;

a plurality of lateral ribs formed in said bottom and raised therefrom, said plurality of lateral ribs extending a substantial distance across said bottom and having a height from said bottom that gradually decreases from a central point to the two longitudinal sides;

a corner receptacle formed at each corner of said plurality of sides; and a plurality of removable spacers each having a predetermined length, one each of said plurality of removable spacers adapted to be held by one of said corner receptacles.

2. A mushroom growing tray as in claim 1 further comprising:

a gap formed between each of said plurality of rib and an opposing pair of said plurality of side walls.

3. A mushroom tray as in claim 1 wherein:

said corner receptacle is open to the interior of the tray.

4. A mushroom growing tray comprising:

a plurality of sides;

a bottom connected to said plurality of sides;

a plurality of ribs formed in said bottom and raised therefrom, said plurality of ribs extending a substantial distance across said bottom;

a gap formed between each of said plurality of rib and an opposing pair of said plurality of side walls;

placement edges formed on said plurality of sides at each corner;

placement ridges formed at each corner on said bottom; and a plurality of removable spacers, each one of said plurality of removable spacers adapted to be held in position by said placement edges and said placement ridges.

5. A mushroom growing tray as in claim 4 wherein:

each of said plurality of ribs has a height from said bottom that gradually decreases from a central point to said gap at each of the opposing pair of said plurality of side walls.

6. A mushroom growing tray as in claim 5 further comprising:

a lip formed on each of said plurality of sides.

7. A mushroom growing tray as in claim 6 further comprising:

a plurality of corrugations formed between said plurality of ribs.

8. A mushroom growing tray as in claim 7 further comprising:

a plurality of holes formed between said plurality of corrugations.

9. A mushroom growing tray as in claim 8 wherein:

the tray is made of a composite material.

10. A composite mushroom growing tray comprising:

a plurality of sides forming a rectangle having an interior space;

a lip formed on each of said plurality of sides;

a bottom connecting to said plurality of sides;

a plurality of corner receptacles, one of said plurality of corner receptacles formed at each corner of the tray;

a plurality of removable spacers, one of said plurality of removable spacers adapted to fit within each of said plurality of corner receptacles;

a plurality of ribs formed in said bottom and raised therefrom, said plurality of ribs extending a substantial distance across said bottom and having a height from said bottom that gradually decreases from a central point to each side wall of an opposing pair of said plurality of side walls;

a gap formed between each of said plurality of ribs and an opposing pair of said plurality of side walls a plurality of corrugations formed between said plurality of ribs and extending perpendicular thereto; and a plurality of holes formed between said plurality of corrugations.

11. A composite mushroom growing tray as in claim 10 wherein:

the composite mushroom tray is fiber reinforced.

12. A composite mushroom growing tray as in claim 10 wherein:

said plurality of corner receptacles each further comprises a placement ridge extending from said bottom of said tray, and a plurality of placement edges extending along each of said plurality of sides.

13. A composite mushroom growing tray as in claim 12 wherein:

each of said plurality of corner receptacles are open to the interior space of the tray.

14. A composite mushroom growing tray comprising:

a plurality of sides forming a rectangle having an interior space;

a lip formed on each of said plurality of sides;

a bottom connecting to said plurality of sides;

a plurality of corner receptacles, one of said plurality of corner receptacles formed at each corner of the tray, said plurality of corner receptacles each further comprises a placement ridge extending from said bottom of said tray, and a plurality of placement edges extending along each of said plurality of sides;

a plurality of spacers, one of said plurality of spacers adapted to fit within each of said plurality of corner receptacles;

a plurality of ribs formed in said bottom and raised therefrom, said plurality of ribs extending a substantial distance across said bottom and having a height from said bottom that gradually decreases from a central point to each side wall of an opposing pair of said plurality of side walls;

a gap formed between each of said plurality of ribs and an opposing pair of said Plurality of side walls;

a plurality of corrugations formed between said plurality of ribs and extending perpendicular thereto;

a plurality of holes formed between said plurality of corrugations; and support feet placed at each corner of the tray, a portion of said support feet recessed forming a recessed corner plane with a bottom surface of said support feet in a plane common with said bottom.

15. A fiber reinforced composite mushroom growing tray comprising:

a plurality of sides forming a rectangle having an interior space;

a lip formed on each of said plurality of sides;

a bottom connecting to said plurality of sides;

a plurality of corner receptacles, one of said plurality of corner receptacles formed at each corner of the tray and open to the interior space formed by said plurality of sides;

a placement ridge extending from said bottom of said tray within each of said plurality of corner receptacles;

a plurality of placement edges extending along each of said plurality of sides;

a plurality of spacers, one of said plurality of spacers adapted to fit within each of said plurality of corner receptacles and held into position by said placement ridge and said plurality of placement edges;

support feet placed at each corner of the tray, a portion of said support feet recessed forming a recessed corner plane with a bottom surface of said support feet in a plane common with said bottom, said support feet positioned beneath said plurality of corner receptacles and adapted to nest with an adjacent spacer;

a plurality of ribs formed in said bottom and raised therefrom, said plurality of ribs extending a substantial distance across said bottom and having a height from said bottom that gradually decreases from a central point to each side wall of an opposing pair of said plurality of side walls;

a gap formed between each of said plurality of ribs and an opposing pair of said plurality of side walls;

a plurality of corrugations formed between said plurality of ribs and extending perpendicular thereto; and a plurality of holes formed between said plurality of corrugations.

16. A rectangular mushroom growing tray made of a composite material comprising:

a plurality of sides, including two longitudinal sides and two lateral sides;

a lip formed on at least the two longitudinal sides of said plurality of sides;

a bottom connected to said plurality of sides, said bottom having a plurality of holes therein;

a plurality of lateral ribs formed in said bottom and raised therefrom, said plurality of lateral ribs extending a substantial distance across said bottom and having a height from said bottom that gradually decreases from a central point to the two longitudinal sides;

a corner receptacle formed at each corner of said plurality of sides;

a removable spacer adapted to be held at each of said corner receptacle; and support feet placed at each corner of the tray, a portion of said support feet recessed forming a recessed corner plane with a bottom surface of said support feet in a plane common with said bottom.

* * * * *